United States Patent
Krutzsch et al.

[11] Patent Number: 5,458,850
[45] Date of Patent: Oct. 17, 1995

[54] METHOD AND APPARATUS FOR REDUCING EXHAUST GASES PARTICLES

[75] Inventors: Bernd Krutzsch, Denkendorf; Guenter Wenninger, Stuttgart; Friedrich Wirbeleit, Esslingen-Ruedern; Juergen Steinwandel, Oberuhldingen; Rainer Willneff, Markdorf; Theodor Staneff, Bermatingen; Hans G. Mueller, Friedrichshafen; Martin Stroeer, Immenstaad; Rainer Schmidberger, Markdorf, all of Germany

[73] Assignee: Daimler-Benz Aktiengesellschaft, Germany

[21] Appl. No.: 258,626

[22] Filed: Jun. 10, 1994

[30] Foreign Application Priority Data

Jun. 10, 1993 [DE] Germany .................... 43 19 283.1

[51] Int. Cl.⁶ .................... F01N 3/02; B03C 3/14
[52] U.S. Cl. .................... 422/21; 422/22; 422/168; 422/186; 422/255; 60/273; 60/275; 96/97
[58] Field of Search .................... 422/20, 21, 22, 422/186, 168, 255; 60/275, 273; 55/152

[56] References Cited

U.S. PATENT DOCUMENTS

| | | | |
|---|---|---|---|
| 4,345,572 | 8/1982 | Suzuki et al. | 123/568 |
| 4,380,900 | 4/1983 | Linder et al. | 60/275 |
| 4,406,119 | 9/1983 | Kamiya et al. | 60/275 |
| 4,478,613 | 10/1984 | Brettschneider | 55/127 |
| 4,649,703 | 3/1987 | Dettling et al. | 60/275 |
| 4,689,951 | 9/1987 | Polach | 60/275 |
| 4,718,923 | 1/1988 | Haag et al. | 55/124 |
| 4,825,651 | 5/1989 | Puschner et al. | 60/275 |
| 4,871,515 | 10/1989 | Reichle et al. | 422/174 |
| 4,923,484 | 5/1990 | Saito | 55/21 |
| 5,053,914 | 10/1991 | Wessel et al. | 361/235 |
| 5,087,272 | 2/1992 | Nixdorf | 55/96 |
| 5,121,734 | 6/1992 | Grieshaber et al. | 60/275 |

Primary Examiner—Timothy M. McMahon
Assistant Examiner—N. Bhat
Attorney, Agent, or Firm—Evenson, McKeown, Edwards & Lenahan

[57] ABSTRACT

A method and an apparatus reduces particles in exhaust gases of an internal combustion engine by passing the exhaust gases through a microwave energy field in a resonator for applying energy and burning the particles. In order to improve the application of energy, the particles are agglomerated beforehand in a high-voltage field of an electrostatic filter.

9 Claims, 1 Drawing Sheet

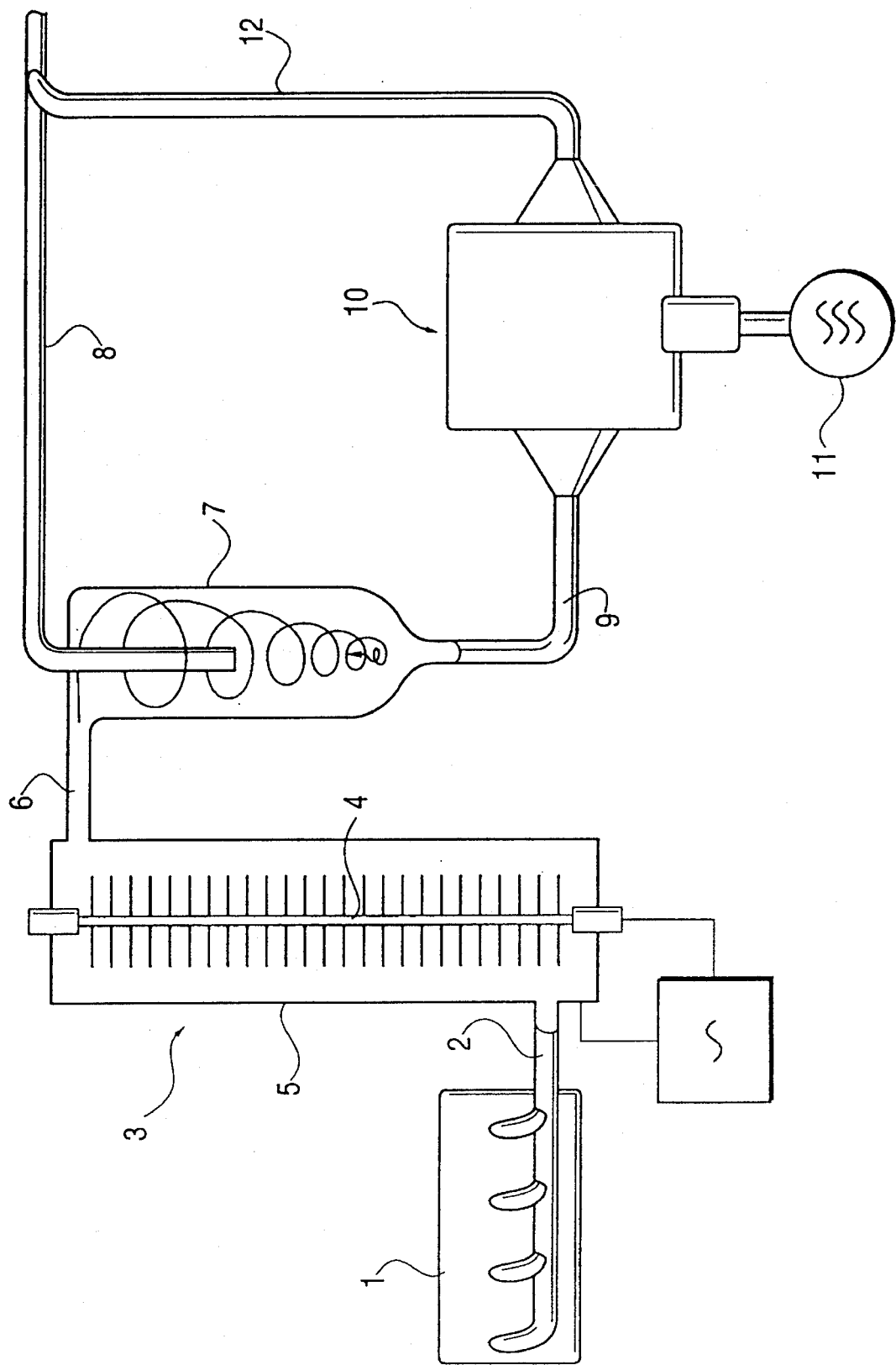

METHOD AND APPARATUS FOR REDUCING EXHAUST GASES PARTICLES

BACKGROUND AND SUMMARY OF THE INVENTION

The present invention relates to a method and apparatus for reducing particles in the exhaust gases of, in particular, auto-ignition type internal combustion engines.

DE 35 28 445 A1 describes a method and apparatus in which energy is fed to the particles by an electromagnetic field generated by a microwave source in order to burn the particles. It has been found, however, that it is almost impossible to feed sufficient energy via the electromagnetic field to the freely streaming particles in the exhaust gas in order to heat the particles to the temperature of combustion and thereby burn them.

An object of the present invention is to provide a method and apparatus such that sufficient energy is transmitted to the freely streaming particles in the exhaust gas stream by the electromagnetic field in order to bring the particles to the temperature of combustion and burn them.

This object has been achieved according to the present invention by agglomerating the particles before passing them through the microwave energy field.

When the exhaust gases are treated by the method according to the present invention, the particles have a significantly larger size upon reaching the electromagnetic field than when in the untreated state. The energy of the electromagnetic field can be applied with significantly greater ease to larger particles of this type than to smaller particles which, when in their untreated state, have a diameter of the order of 0.1 μm and are thus too small to enable microwave energy to be absorbed to any appreciable degree.

In the case of the particle size of at least about 10 μm, there is, on one hand, advantageous application of microwave energy and, on the other hand, particle enlargement does not even involve too much expenditure. This enlargement is effected most advantageously in an electric high-voltage field of an electrostatic filter.

By concentration of particles in the exhaust gas stream fed to the microwave energy field, application of the microwave energy to the particles is further improved because, when the extent of the microwave energy field is constant, the particle retention time in this field is increased or the microwave energy field can be further concentrated. At the same time it is further advantageous if the particle concentration and division of the exhaust gas stream occur downstream from particle enlargement.

An apparatus for implementing the method according to the present invention contemplates the particle enlargement occurring in the electrostatic filter and energy application for burning the particles occurring in the resonator. A particular apparatus for concentrating the particles comprises a resonator through which an exhaust gas stream passes and in which a microwave source generates an electromagnetic field, and an electrostatic filter generating a high-voltage field arranged in the exhaust gas stream upstream from the resonator.

BRIEF DESCRIPTION OF THE DRAWING

The accompanying sole FIGURE which is a schematic drawing of an internal combustion engine with a cavity resonator and electrostatic filler in accordance with the present invention.

DETAILED DESCRIPTION OF THE DRAWING

An internal combustion engine 1 of the auto-ignition reciprocating-piston type has an exhaust manifold 2 for leading a stream of particle-charged exhaust gases to an electrostatic filter 3. The particles in the exhaust gases are of different sizes, but mainly have a diameter of the order of approximately 0.1 μm. In the electrostatic filter 3 a high voltage is applied between a central axial electrode 4 and an outer electrode 5, generating a high-voltage field through which the exhaust gases of the internal combustion engine 1 pass. At the same time, the small particles mass together to form larger particles (agglomeration), agglomeration in a general sense being known per se. The strength and extent of the high-voltage field are sized such that the particles have a greater mass and size when leaving the electrostatic filter 3, with their diameter being of the order of approximately 10 μm or more.

The exhaust gases now having the larger particles stream or are led tangentially via another exhaust manifold 6, which extends from the upper end of the electrostatic filter 3, into a particle separator which is in the form of a cyclone 7 and in which the exhaust gases are divided into a particle-free exhaust gas stream and a particle-concentrated exhaust gas stream. The particle-free exhaust gases are discharged into the atmosphere via an exhaust manifold 8.

The particle-concentrated exhaust gases are fed via another exhaust manifold 9 to a cavity resonator 10 in which they are exposed to an electromagnetic field generated by a diagrammatically illustrated microwave source 11. At the same time microwave energy is applied to the freely streaming particles such that the particles are heated to the temperature of combustion and, because the particles consist essentially of carbon in the form of soot, the particles burn. Energy application to the particles is considerably facilitated by enlarging the particles by agglomeration in the electrostatic filter 3. Also, the concentration of the particles in the partial stream of exhaust gases fed to the microwave energy field favors energy application when compared with feeding all the exhaust gases to the microwave energy field since, when the size of the resonator 10 is constant, the retention time of the exhaust gases and thus of the particles in this resonator is increased or, when the particle retention time is constant, concentration of the microwave energy field can be effected, as a result of which the overall size of the resonator 10 is also reduced.

The exhaust gases from which the particles have been extensively removed are fed from the resonator 10 via another exhaust manifold 12 to the exhaust manifold 8 and flow from there into the atmosphere. It is possible for an additional particle filter to be provided in the exhaust manifolds 12 or 8 following the resonator 10 in order also to retain any possibly present residue of particles which, for example, are not accessible to the necessary degree of energy application in the microwave energy field, as a result of insufficient agglomeration in the electrostatic filter.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method of reducing particles in the exhaust gases of an internal combustion engine, comprising the steps of enlarging the particles by agglomeration and is effected in an electric high voltage field of an electrostatic filter and passing the enlarged particles through an electromagnetic microwave energy field for the application of energy to the particles.

2. The method according to claim 1, wherein the enlarged particles have a size of at least approximately 10 μm.

3. The method according to claim 1, wherein dividing of an original stream of the exhaust gases into a plurality of exhaust gas streams occurs, before passing the exhaust gases through the microwave energy field, one of the streams having a considerably higher particle concentration than the original exhaust gas stream, and only the one stream being fed to the microwave energy field.

4. The method according to claim 3, wherein the enlarged particles have a size of at least approximately 10 μm.

5. The method according to claim 3, wherein the division of the exhaust gas stream occurs in a region downstream of a region where particle enlarging occurs.

6. An apparatus for reducing particles in exhaust gases of an internal combustion engine, comprising a resonator through which an exhaust gas stream passes and in which a microwave source generates an electromagnetic field, and an electrostatic filter generating a high-voltage field arranged in the exhaust gas stream upstream from the resonator.

7. The apparatus according to claim 6, wherein a particle separator is arranged in the exhaust gas stream between the electrostatic filter and the resonator, and an exhaust manifold containing a higher concentration of particles and to which the resonator is connected extends from the particle separator.

8. The apparatus according to claim 7, wherein the particle separator is configured as a cyclone particle separator.

9. The apparatus according to claim 6, wherein the internal combustion engine is an auto-ignition type internal combustion engine.

\* \* \* \* \*